No. 658,361. Patented Sept. 25, 1900.
W. S. FRAZIER, Jr.
FIFTH WHEEL.
(Application filed May 9, 1900.)
(No Model.)
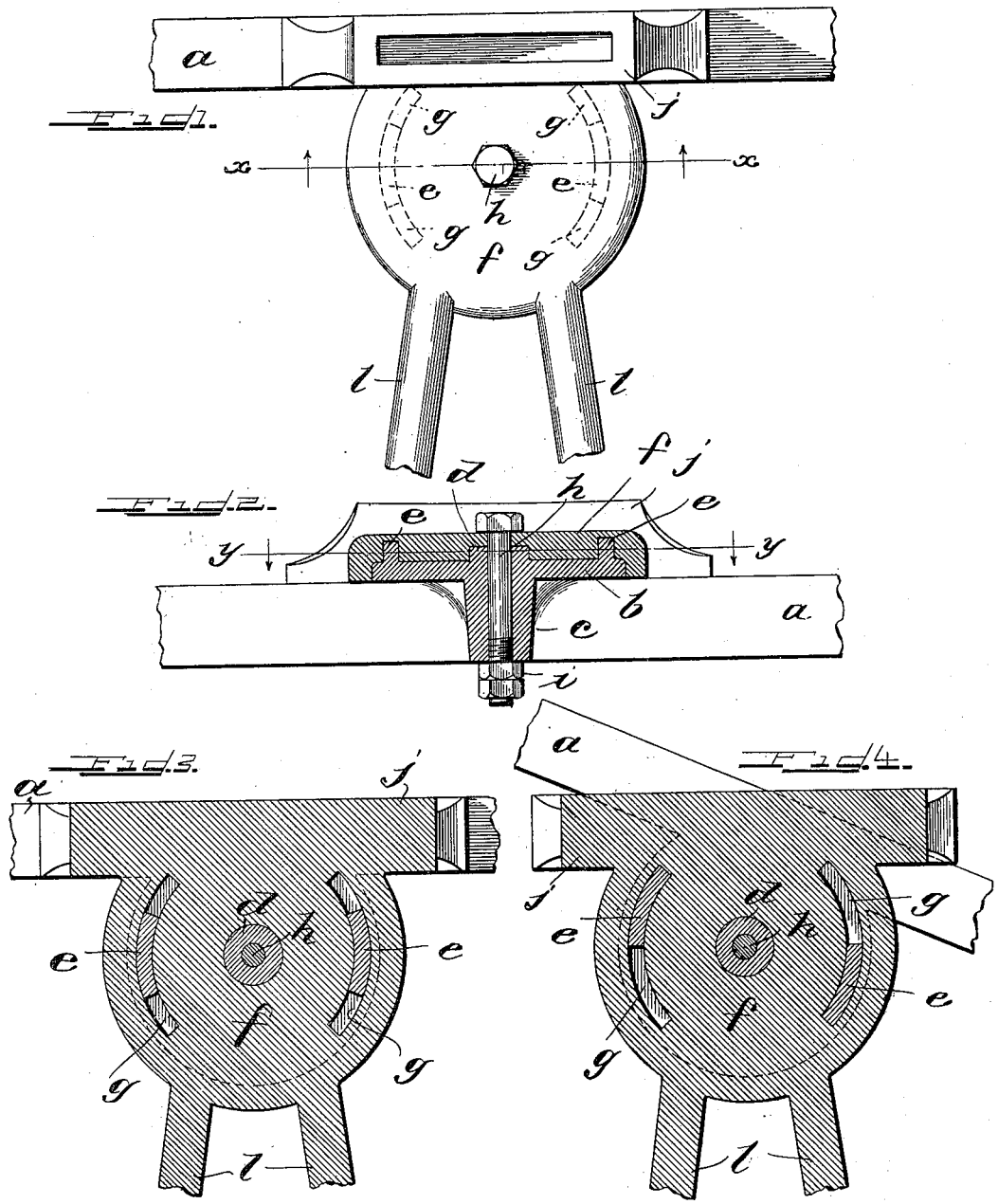

United States Patent Office.

WALTER S. FRAZIER, JR., OF AURORA, ILLINOIS, ASSIGNOR TO THE W. S. FRAZIER & COMPANY, OF SAME PLACE.

FIFTH-WHEEL.

SPECIFICATION forming part of Letters Patent No. 658,361, dated September 25, 1900.

Application filed May 9, 1900. Serial No. 16,009. (No model.)

*To all whom it may concern:*

Be it known that I, WALTER S. FRAZIER, Jr., a citizen of the United States, residing at Aurora, in the county of Kane and State of Illinois, have invented certain new and useful Improvements in Fifth-Wheels, of which the following is a specification, reference being had to the accompanying drawings.

My invention relates to a new and improved fifth-wheel or coupling for vehicles, and particularly to a fifth-wheel or coupling intended for use on a carriage, buggy, or other similar vehicle.

The object of the invention is to provide a fifth-wheel or coupling for the purpose stated that will be simple in construction, neat in appearance, durable, and effective, and I accomplish this object by the construction and arrangement of parts, as shown in the drawings and as hereinafter described.

Many carriages and buggies are so constructed as not to permit the front wheels to turn in under the body of the vehicle, and it is therefore necessary to provide plates at each side of the body for the wheels to rub or bear against when turning around or to one side. By my improved construction of fifth-wheel I am enabled to dispense with such side rubbing-plates on the carriage-body and at the same time prevent the wheels when turning to one side from contacting and injuring or marring the body, and I accomplish this by providing in the face of one of the parts of the fifth-wheel or coupling one or more semicircular grooves, into which project one or more lugs or projections on the face of the other part of the fifth-wheel, said grooves and lugs being arranged to act as stops and prevent the turning of the wheels sufficiently far around to strike the carriage-body.

That which I believe to be new will be set forth in the claims.

In the accompanying drawings, Figure 1 is a top or plan view. Fig. 2 is a vertical section at line $x$ $x$ of Fig. 1. Fig. 3 is a horizontal section at line $y$ $y$ of Fig. 2; and Fig. 4 is a view similar to that of Fig. 3, but showing the parts in the position assumed when the axle is turned to the limit of its movement.

Referring to said drawings, $a$ indicates an ordinary axle, upon the upper face of which and projecting rearwardly therefrom is the lower portion $b$ of the coupling or fifth-wheel, the same being in the shape of an annular plate or disk. This plate or disk is preferably formed with the axle, but may be separately formed and suitably secured in position on the axle. From the lower face of this plate or disk, at its center, extends a long hub $c$, and opposite such hub and projecting from the upper face of the said disk is a circular boss $d$. Near the edge of the disk $b$ are two curved lugs $e$, which enter curved grooves in the lower face of the other member of the device.

$f$ indicates the upper portion of the fifth-wheel or coupling, which is also circular in shape and has formed with it a flange that extends around the edge of the disk $b$, as shown. On its under face it is provided with a socket adapted to fit over the boss $d$ and is also provided near its edges with the curved grooves referred to to receive the lugs $e$, said grooves being indicated by $g$ $g$.

$h$ indicates the king-bolt, passing down through central openings in the parts $b$, $c$, $d$, and $f$ and secured in place by a nut $i$, bearing against the under face of the elongated hub $c$. By reason of the boss $d$ fitting in the correspondingly-shaped recess in the upper part $f$ of the coupling the king-bolt is relieved of the excessive lateral strain that would otherwise be brought to bear upon it.

$j$ indicates a head at the forward portion of the upper part $f$ of the coupling and preferably integral therewith, as shown. On its upper face is a suitable socket or seat $k$ to receive the usual spring or head-block for connecting the coupling and the carriage-body.

$l$ $l$ indicate reach-irons projecting rearwardly from the part $f$.

By the construction shown and described a very simple, cheap, and durable device of the character mentioned is provided, which while performing satisfactorily the functions of a fifth-wheel also possesses the advantage of limiting the turning of the front wheels of the carriage, so as to prevent them from contacting with the body of the carriage, and thereby rendering it unnecessary to provide the body with the usual rub-plates.

That which I claim as my invention, and desire to secure by Letters Patent, is—

1. In a carriage fifth-wheel or coupling, the plate $b$ secured to the rear side of the front axle of a carriage, and provided centrally with the hub $c$ on its lower face and boss $d$ on its upper face, and also in its upper face a lug $e$, in combination with the plate $f$ having a central recess adapted to receive the boss $d$ and a curved groove $g$ adapted to receive the lug $e$, and a king-bolt passing through the two plates and the hub $c$ and boss $d$, substantially as and for the purpose specified.

2. In a carriage fifth-wheel or coupling, the combination of a plate secured to the rear side of the front axle, a pair of curved lugs on the upper face thereof, a plate mounted upon said first-named plate and provided on its lower face with a pair of curved grooves adapted to receive said lugs, reach-irons projecting rearwardly from said last-named plate, and means for pivotally connecting said plates together, substantially as described.

WALTER S. FRAZIER, JR.

Witnesses:
 L. V. FRAZIER,
 WM. HENDERSON.